United States Patent Office 2,755,913
Patented July 24, 1956

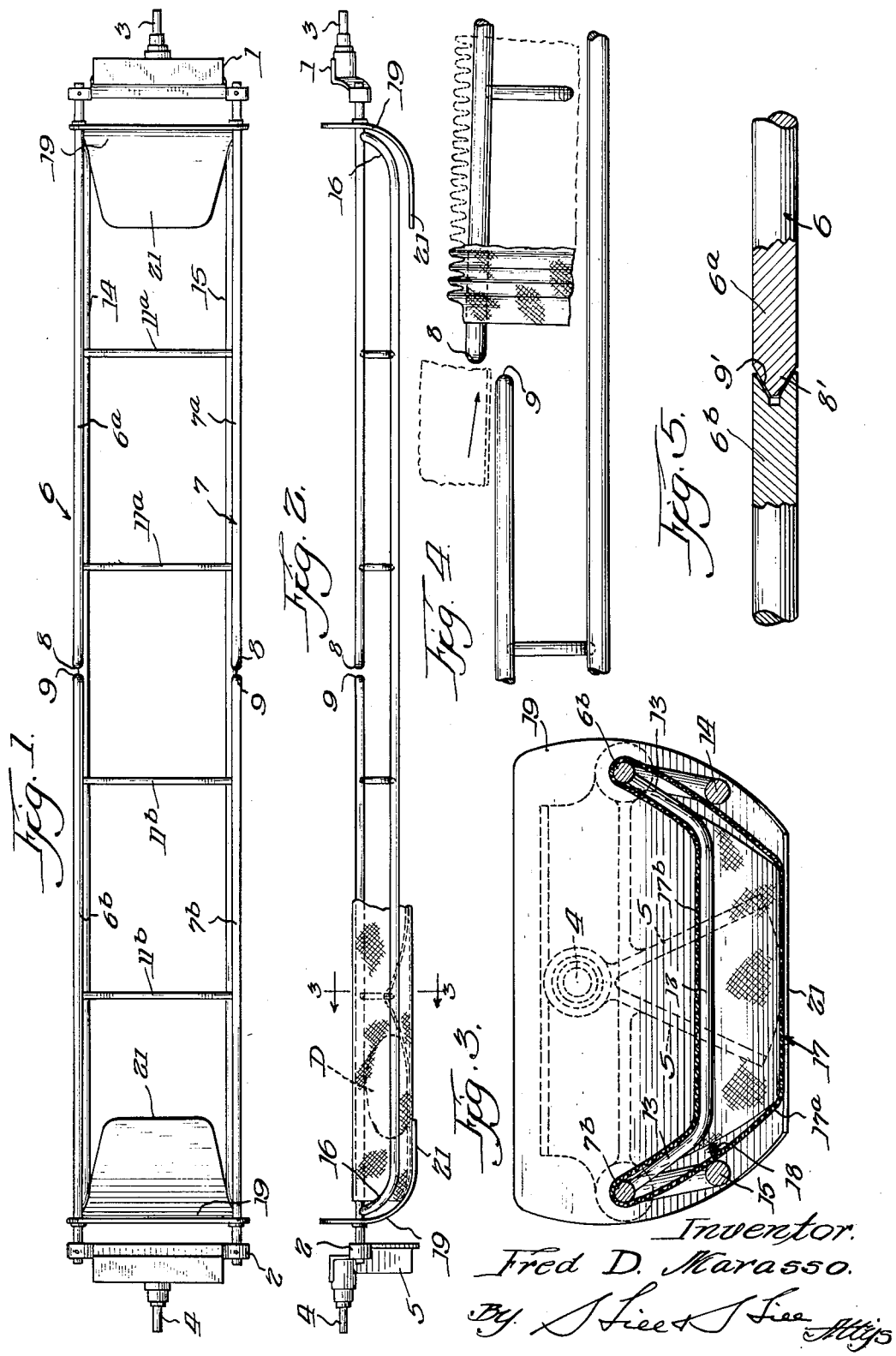

2,755,913

PROOFER TRAY

Fred D. Marasso, Joliet, Ill., assignor to Union Machinery Company, Joliet, Ill., a corporation of Illinois Application August 8, 1949, Serial No. 109,205

14 Claims. (Cl. 198—152)

The invention relates generally to proofer trays employed in apparatus for the purpose of conveying lumps of dough through a proofing chamber, and more particularly to a proofer tray embodying a removable dough supporting member.

The invention is an improvement of the proofer tray shown and described in my prior Patent No. 2,104,431, issued on January 4, 1938. As illustrated in my prior patent, proofer trays of the type herein involved are adapted to be carried by conveyor chains, or the like, located at opposite ends of the tray, the latter being adapted to receive lumps of dough and support the same during the movement of the tray. The dough was supported upon a fabric sleeve which enclosed a supporting tray and, as the tray reached the end of its travel, it was inverted, depositing the dough thereon in a tray positioned therebelow. During the inverting of the tray, the fabric liner was free to rotate about the tray, and in use it was necessary to periodically remove the fabric liner and replace it with a clean one, this being accomplished by disconnecting one end of the tray from its supporting structure and withdrawing the liner member over the free end of the tray, after which a new liner was slid over such end and the latter reconnected with the conveyor mechanism. As the trays are normally supported by chain running over sprocket wheels, or the like, it will be apparent that, with this construction, insertion of the liner over the end of the trays may result in soiling of the liner as the sprocket engaging mechanism may be greasy or oily; a particularly undesirable condition as edible material is being carried by such liner member.

The present invention, therefore, has among its objects the production of a proofer tray employing a removable dough carrying member which will provide all the advantages of the construction illustrated in my previous patent and, at the same time, permit ready removal of the dough carrying member without disconnecting the ends of the tray from the conveyor mechanism, and without passing such member over an end of the tray.

Another object of the invention is the production of such a tray construction by the use of which excellent sanitary conditions may be maintained at all times with no corners or relatively large surfaces whereon flour, or other material, may accumulate, and in which the dough carrying member is positively held in position axially, whereby the same cannot come in contact with the chains, sprocket wheels, or other portions of the conveyor mechanism.

A further object of the invention is the production of such a tray in which the dough carrying member is subjected to adequate ventilation whereby the dough will be received on a relatively dry portion of the member and thus reduce the amount of dusting flour required on the dough, with a resultant decrease in flour accumulation on the member or the supporting structure.

A further object of the invention is the production of a tray having the above advantages which may be readily cleaned, is relatively simple in construction, durable in use, and very efficient for the purposes intended.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, wherein like reference characters indicate like or corresponding parts:

Fig. 1 is a top plane view of the supporting frame structure of the tray;

Fig. 2 is a side elevational view of the structure illustrated in Fig. 1;

Fig. 3 is a transverse sectional view taken approximately on the line 3—3 of Fig. 2, with the dough supporting member in operative position;

Fig. 4 is a side elevational view of the central portion of the structure illustrated in Figs. 1 and 2 showing the separation of the supporting elements during removal or replacement of the dough carrying member; and Fig. 5 is an enlarged sectional view of one of the dough supporting members showing the details of the separable joint therein.

Referring to the drawings, and particularly to Figs. 1, 2, and 3, the numerals 1 and 2 indicate a pair of spaced end members adapted to be supported by a suitable conveyor mechanism, as for example spaced chains carried by sprocket wheels. The end member 1 may be formed with a suitable bearing pin 3, or the like, for engaging a part of the conveyor mechanism, and the end member 2 may be provided with a similar bearing pin 4, by means of which the respective end members may be supported on the conveyor mechanism. Likewise, the member 2 may be provided with means such as the wings 5 for engagement with suitable tray inverting mechanism, the details of the conveyor and inverting mechanism forming no part of the present invention.

Extending between the two end members 1 and 2 are a pair of spaced parallel rods or bars 6 and 7, each divided intermediate their ends into two sections *a* and *b*, with the sections 6a and 7a having their outer ends rigidly connected to the end member 1, and the sections 6b and 7b having their outer ends rigidly connected to the end member 2. The adjoining ends 8 and 9 of the sections 6a and 6b, and of the sections 7a and 7b are preferably rounded and slightly spaced from one another, as illustrated in Figs. 1, 2, and 4. However, as illustrated in Fig. 5, the adjoining ends of the sections comprising each of the members 6 and 7 may be provided with interlocked portions. For example, the section 6a may have a conical-shaped tip 8' adapted to seat in a similarly shaped recess 9' in the adjacent end of the section 6b, so that the interlocked ends of each pair of sections may be normally positively maintained in axial alignment.

Each pair of laterally adjacent sections are connected by suitable cross members, the sections 6a and 7a being connected by cross members 11a, and the sections 6b and 7b being connected by the cross members 11b, operative to maintain each pair of adjacent sections in parallel relation. As illustrated in Fig. 3, each cross member comprises a substantially horizontally extending intermediate portion 12 terminating at its ends in upwardly and outwardly extending portions 13, with the free ends of the cross members rigidly secured to the respective sections by welding, or other suitable means.

Operatively connecting each pair of aligned sections are longitudinally extending rods or bars 14 and 15, each provided with upturned ends 16 secured to the respective sections adjacent the end members 1 and 2 by welding, or other suitable means, the bar 14 being connected at its ends to the sections 6a and 6b, and the bar 15 being connected at its ends to the sections 7a and 7b, with the intermediate portions of both bars 14 and 15 extending substantially parallel to the respective bars 6 and 7. The divided bars 6 and 7, and continuous bars 14 and 15 are constructed of stock having sufficient rigidity to normally maintain the respective elements in the positions illustrated in Figs. 1 and 2, but having sufficient inherent resiliency to permit the adjoining ends 8 and 9 to be moved to a position such as illustrated in Fig. 4.

Extending around the bars 6 and 7 and cross bars 11 is a tubular sleeve-like dough supporting member, indicated generally by the numeral 17, similar to that illustrated in my prior patent, which may be constructed of any suitable material, as for example a suitable fabric, or the like, either woven in the form of a seamless tube or formed from a sheet of material with opposite longitudinal edges stitched together, as indicated at 18. The length of the member 17 is approximately equal to the distance between the connections of each of the bars 14 and 15 with the bars 6 and 7, and the member may be readily applied to the supporting structure illustrated in Figs. 1 and 2 by moving the intermediate portions of the bars 6 and 7 adjacent the junctures of their respective sections, as illustrated in Fig. 4. Upon sufficient separation of the respective sections, the dough supporting member 17 may be readily slid over one pair of adjacent sections, and when such sections have been inserted entirely through the dough supporting member, as illustrated in Fig. 4, the sections may be permitted to resume the positions illustrated in Figs. 1 and 2, after which the dough supporting member may be slid over the opposite section and thus extend from substantially one end member to the other.

Suitably mounted on the respective rods 6 and 7 adjacent each end member is an end plate 19 of more or less semicircular-shape in end elevation, and curved inwardly to form a more or less horizontally extending portion 21 adapted to underlie the end edges of the member 17, as illustrated in Fig. 3.

It will be noted that the lower or outer portion 17a of the dough supporting member is positioned inside the bars 14 and 15, and the length of the member 17 is approximately equal to the distance between the ends of such bars, so that longitudinal movement of the end edges of the member 17 is prevented by the adjacent ends 16 of the bars. The circumference of the tubular member 17 is preferably such that when dough D, indicated in dotted lines, is placed on the member between the cross members 11, the inner or top portion 17b and outer portion 17a supporting the dough will approach an approximately common curvature, as indicated in Fig. 3. The cross members 11a and 11b, however, will maintain spaced portions of the member 17 adjacent such cross members in elevated position, so that when the dough is dropped on the supporting member 17, a series of pockets will be formed effectively separating each lump of dough. The number of cross members employed may be varied to provide any desired number of pockets.

The portions 21 of the end plates 19 supporting the free edges of the member 17 prevent dough in the extreme end pockets from working to the edge of the supporting member, and it will be apparent that, as the tubular supporting member 17 is in contact with the metal cross members and portions 21 at spaced intervals with relatively no large areas overlying solid surfaces, such as is done in my previous patent, the material comprising the member 17 is substantially completely exposed to the air and is maintained relatively dry, as a result of which less dusting flour is required than with previous trays, and there is less tendency for the dough to stick to the fabric. Consequently, the tubular dough supporting members may be used for greater periods without requiring replacement. In removing the dough supporting member 17 from the structure illustrated in Figs. 1 and 2, the member may be grasped adjacent the ends 8 and 9 of the supporting bars and upward pressure applied to the member thereat, whereupon the respective sections 6a, 6b, 7a, and 7b will give sufficiently to permit the member to slide off of the same. If the construction illustrated in Fig. 5 is employed, the member 17 may be applied by moving the interlocked ends 8 and 9 upwardly until they are separated, and then applying the member to one side, as heretofore described, reengaging the ends 8 and 9, and subsequently sliding the member over the opposite sections. Likewise, the member may be readily removed by reversing this procedure.

It will also be noted from the above description that in removing the tubular supporting member from the supporting bars, as the member 17 is removed from the center of the trays, it is unnecessary to disconnect the end members 1 and 2 from the conveyor mechanism, or to pass the member 17 over the end members which may carry grease and oil thereon, thus eliminating possible soiling of a clean supporting member being applied to the device. Likewise, as the supporting structure is composed mainly of relatively small bars or rods, corners and flat surfaces which may accummulate flour, or other material, thereon are practically eliminated and the entire structure may be readily cleaned when desired.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a proofer tray, a flexible elongated sleeve-like dough supporting member, open at its opposite ends, an elongated supporting structure for said member, said structure having supporting elements for said member positioned in and operatively extending longitudinally through the latter, and having a longitudinally extending element positioned exterior the member, said supporting elements being divided intermediate their ends to permit the dough supporting member to be applied to or removed from the supporting structure at such division without passing over the ends of the latter, said exterior element operatively connecting the separable portions of said supporting elements and having sufficient inherent resiliency to permit the desired separation thereof.

2. In a proofer tray, a flexible elongated sleeve-like dough supporting member, open at its opposite ends, an elongated supporting structure for said member, said structure having a pair of longitudinally extending supporting elements positioned in and extending longitudinally through said member, and having a pair of longitudinally extending elements positioned exterior the member, said pair of supporting elements being divided intermediate their ends to permit the dough supporting member to be applied to or removed from the supporting structure at such division without passing over the ends of the latter, said exterior elements each operatively connecting the separable portions of a respective supporting element and having sufficient inherent resiliency to permit the desired separation thereof.

3. In a proofer tray, a flexible elongated sleeve-like dough supporting member, open at its opposite ends, an elongated supporting structure for said dough supporting member, said structure having supporting elements for said dough supporting member positioned in and operatively extending longitudinally through the latter and adapted to space one or more lumps of dough supported on said dough supporting member, said supporting elements being divided intermediate their ends to permit the dough supporting member to be applied to or removed from the supporting structure at such division without passing over the ends of the supporting structure.

4. In a proofer tray, a pair of spaced end members, a pair of spaced parallel bars extending between said end members, each of said bars being separable intermediate its ends into two sections, the adjacent ends of each pair of bars having coacting means thereon for normally maintaining such ends in alignment, spaced transversely extending bars connecting the respective bars of adjacent sections of said first bars, and a pair of longitudinally extending bars each operatively connected to one of the first-mentioned bars adjacent said end members and adapted to normally maintain the respective sections of each of said first-mentioned bars in aligned relation, said second pair of bars having sufficient inherent resiliency to permit a desired separation of the adjoining sections of each of said first bars, a flexible elongated sleeve-like dough supporting member open at its opposite ends and encircling said first-mentioned pair of bars and said transversely extending bars, an end plate positioned adjacent each end of said member, and means carried by each end plate adapted to underlie said dough supporting member adjacent said end members.

5. In a proofer tray, a pair of spaced end members, a pair of spaced parallel bars extending between said end members, each of said bars being divided intermediate its ends into two sections, spaced transversely extending bars connecting the respective bars of adjacent sections of said first bars, and a pair of longitudinally extending bars each operatively connected to one of the first-mentioned bars adjacent said end members and adapted to normally maintain the respective sections of each of said first-mentioned bars in aligned relation, said second pair of bars having sufficient inherent resiliency to permit a desired separation of the adjoining sections of each of said first bars, a flexible elongated sleeve-like dough supporting member open at its opposite ends and encircling said first-mentioned pair of bars and said transversely extending bars, an end plate positioned adjacent each end of said member, and means carried by each end plate adapted to underlie said dough supporting member adjacent said end members.

6. In a proofer tray, a pair of spaced end members, a pair of spaced parallel bars extending between said end members, each of said bars being divided intermediate its ends into two sections, spaced transversely extending bars connecting the respective bars of adjacent sections of said first bars, and a pair of longitudinally extending bars each operatively connected to one of the first-mentioned bars adjacent said end members and adapted to normally maintain the respective sections of each of said first-mentioned bars in aligned relation, said second pair of bars having sufficient inherent resiliency to permit a desired separation of the adjoining sections of each of said first bars, and a flexible elongated sleeve-like dough supporting member, open at its opposite ends, encircling said first-mentioned pair of bars and said transversely extending bars, and positioned between said second pair of bars.

7. In a proofer tray, a pair of spaced end members, a pair of spaced parallel bars extending between said end members, each of said bars being separable intermediate its ends into two sections, the adjacent ends of each pair of bars having coacting means thereon for normally maintaining such ends in alignment, spaced transversely extending bars connecting the respective bars of adjacent sections of said first bars, and a pair of longitudinally extending bars each operatively connected to one of the first-mentioned bars adjacent said end members and adapted to normally maintain the respective sections of each of said first-mentioned bars in aligned relation, said second pair of bars having sufficient inherent resiliency to permit a desired separation of the adjoining sections of each of said first bars, and a flexible elongated sleeve-like dough supporting member, open at its opposite ends, encircling said first-mentioned pair of bars and said transversely extending bars, and positioned between said second pair of bars.

8. In a proofer tray, a pair of spaced end members, a pair of spaced parallel bars extending between and rigidly secured at their ends to said end members, each of said bars being separable intermediate its ends into two sections, the adjacent ends of each pair of bars having coacting means thereon for normally maintaining such ends in alignment, spaced transversely extending bars having upturned ends connected to the respective bars of adjacent sections, and a pair of longitudinally extending bars each having upturned ends connected to one of the first-mentioned bars adjacent said end members and adapted to normally maintain the respective sections of each of said first-mentioned bars in aligned relation, said second pair of bars having sufficient inherent resiliency to permit a desired separation of the adjoining sections of each of said first bars, a flexible elongated sleeve-like dough supporting member open at its opposite ends and encircling said first-mentioned pair of bars and said transversely extending bars, and positioned between said second pair of bars, an end plate positioned adjacent each end of said member and carried by said first pair of bars adjacent the connection of said second pair of bars therewith, and having an inwardly extending extension adapted to underlie the end edge of said dough supporting member.

9. In a proofer tray, a pair of spaced end members, a pair of spaced parallel bars extending between and rigidly secured at their ends to said end members, each of said bars being divided intermediate its ends into two sections, spaced transversely extending bars having upturned ends connected to the respective bars of adjacent sections, and a pair of longitudinally extending bars each having upturned ends connected to one of the first-mentioned bars adjacent said end members and adapted to normally maintain the respective sections of each of said first mentioned bars in aligned relation, said second pair of bars having sufficient inherent resiliency to permit a desired separation of the adjoining sections of each of said first bars, a flexible elongated sleeve-like dough supporting member open at its opposite ends and encircling said first-mentioned pair of bars and said transversely extending bars, and positioned between said second pair of bars, an end plate positioned adjacent each end of said member and carried by said first pair of bars adjacent the connection of said second pair of bars therewith, and having an inwardly extending extension adapted to underlie the end edge of said dough supporting member.

10. A proofer tray for a conveyor mechanism, comprising in combination, a rotatively mounted skelton-like tray frame, said frame adapted to detachably receive a flexible elongated sleeve-like dough supporting member, said tray frame comprising end members adapted to engage a part of said conveyor mechanism and adapted with said conveyor mechanism for inverting the proofer tray, longitudinally extending parallel spaced bars affixed to said spaced end members and intermediately divisible to detachably receive and support said dough supporting member, whereby said dough supporting member when positioned on said tray-like frame is adapted for receiving and spacing one or more lumps of dough supported on said dough supporting member.

11. A proofer tray for a conveyor mechanism, comprising in combination, a skelton-like tray frame, said frame adapted to detachably receive a flexible elongated sleeve-like dough supporting member, said tray frame comprising end members, longitudinally extending parallel spaced bars associated with said end members and intermediately divisible for movement out of the normal plane of bars to detachably receive and support said dough supporting member.

12. A proofer tray for a conveyor mechanism, comprising in combination, a skelton-like tray frame, said frame adapted to detachably receive a flexible elongated sleeve-like dough supporting member, said tray frame comprising end members, upper and lower longitudinally extending parallel spaced bars associated with said end members, and said upper parallel spaced bars separably divisible for relative movement with respect to the lower spaced bars to detachably receive and support said dough supporting member.

13. A proofer tray for a conveyor mechanism, comprising in combination, a skelton-like tray frame, said frame adapted to detachably receive a flexible elongated sleeve-like dough supporting member, said tray frame comprising an end member, upper and lower longitudinally extending parallel spaced bars associated with said end member, said upper parallel spaced bars operatively connected together and mounted with respect to the end member to support the dough supporting member in its assembled position thereon and the upper parallel spaced bars being divided with respect to the end member, said upper parallel spaced bars being movable together angularly to move relatively with respect to the lower parallel spaced bars, whereby said dough supporting member is adapted to be mounted upon and detached from said upper parallel spaced bars.

14. A proofer tray for conveyor mechanism, comprising in combination, a skelton-like tray frame, said frame adapted to detachably receive a flexible elongated sleeve-like dough supporting member, said tray frame comprising an end member, upper longitudinally extending parallel spaced bars affixed to said end member and operatively connected together transversely intermediate the ends thereof for movement together, lower longitudinally extending parallel bars spaced from said upper longitudinally extending parallel bars, said lower bars formed with upturned ends and affixed to said upper bars, and said upper parallel spaced bars divisibly formed and movable angularly with respect to the lower bars for detachably receiving the dough supporting member and supporting said supporting member in the normal parallel position of said upper parallel spaced bars with respect to the lower bars.

References Cited in the file of this patent

UNITED STATES PATENTS

| | | |
|---|---|---|
| 1,382,610 | Streich | June 21, 1921 |
| 1,712,211 | Hanson et al. | May 7, 1929 |
| 2,104,431 | Marasso | Jan. 4, 1938 |

FOREIGN PATENTS

| | | |
|---|---|---|
| 700,174 | Germany | Dec. 14, 1940 |